Patented June 3, 1930

1,761,712

UNITED STATES PATENT OFFICE

RODGER J. EMMERT, OF DAYTON, OHIO, ASSIGNOR TO DELCO-REMY CORPORATION, OF ANDERSON, INDIANA, A CORPORATION OF DELAWARE

MANUFACTURE OF THE CLUTCH CAM FOR ENGINE-STARTER DRIVES

Application filed March 29, 1929. Serial No. 351,022.

This invention relates to improvements in one-way, overrunning clutches used for example in engine starting apparatus and particularly in that type of apparatus which comprises a motor, a pinion driven by the motor and movable axially into mesh with a gear of an engine to be started, and an overrunning clutch for drivingly connecting the motor with the pinion and for permitting the pinion to overrun the motor while the pinion remains in mesh with the engine gear after the engine becomes self-operative.

In certain engine starters which have been in use, the overrunning clutch comprises a clutch cam or driving member which rotates within a clutch shell or driven member and cooperates with balls or rollers, which, while the motor is driving the pinion, are wedged by the cam against the inner cylindrical surface of the clutch shell. The cam is preferably splined to the motor shaft and the shell drivingly connected with the pinion.

One of the objects of the present invention is to provide a novel method of making the clutch driving member or clutch cam in order to reduce the cost of manufacture of the engine starter drive.

Further objects and advantages of the present invention will be apparent from the following description, reference being had to the accompanying drawings wherein a preferred embodiment of one form of the present invention is clearly shown.

Figure 1:
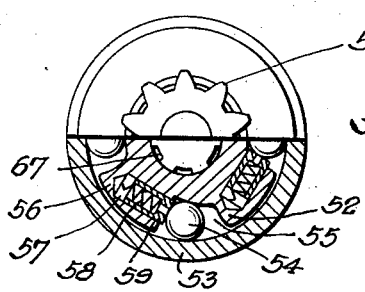
Fig. 1 is an end view partly in cross section of a clutch and pinion assembly, the clutch cam or driving member of which is made according to the present invention.

Referring to Fig. 1, a pinion 50 is integral with or attached to a clutch shell or driven member 53 which is substantially cup-shaped and which encloses the clutch cam or driving member 52. The clutch cam 52 has arms 56 spaced by notches 55. Each arm 56 provides a recess 57 for receiving a spring 58 and a plunger 59 urged by the spring 58 against a roller 54 located in a notch 55. Relative axial movement between the clutch members is limited by any suitable means not shown. It is apparent that rotary movement will be imparted to the pinion by the clutch when the cam 52 turns clockwise, and that the pinion may be rotated relative to the cam 52 in a clockwise direction.

The clutch shell, cam and pinion members are constructed preferably of high grade nickel steel alloy manufactured in an electric furnace. The manufacture of the clutch shell and the motor pinion and the method by which these members are drivingly connected are described and claimed in the copending application of William A. Chryst, Serial No. 348,969, filed March 21, 1929. The present application discloses a preferred method of manufacturing the clutch cam 52, which method will now be described with particular reference to Figs. 2 to 6 inclusive.

Figure 2:
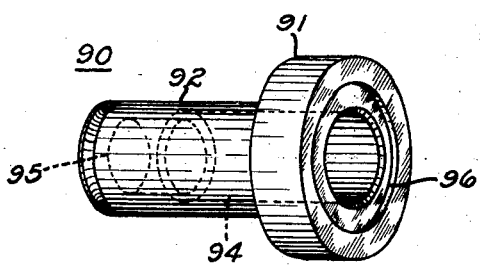
Figs. 2 to 6 are perspective views of the clutch cam in successive stages of manufacture.

The first step in the manufacture of the clutch cam 52 is to manufacture the part 90 from a solid round bar of steel or other suitable material. As shown in Fig. 2, the part 90 comprises a cylindrical portion 91 of the same diameter as that of the round bar from which the part 90 was made, and a cylindrical extension or hub 92 of lesser diameter. The part 90 is provided with a central bore of step formation providing a portion 94 having a diameter slightly greater than the outside diameter of a splined shaft upon which the part 90 is slidable, and providing a portion 95 having a diameter slightly greater than the inside or bottom diameter of the splined portion of said shaft. The part 90 is also provided with a counterbored recess 96.

Figure 3:
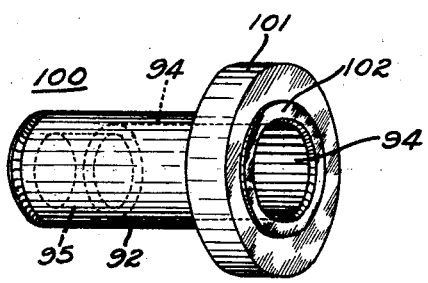

The next step in the manufacture of the clutch cam 52 is to make the part 100 shown in Fig. 3 from the part 90 shown in Fig. 2. The part 100 differs from the part 90 particularly with respect to the cylindrical portion 101 thereof. The portion 101 is less in thickness but greater in outside diameter than the cylindrical portion 91 of the part 90. In the manufacture of the part 100, the portion 91 is placed between the pressure blocks of a hydraulic or suitable punch press and is squeezed axially or in a direction at right angles to the direction of its longer dimension. During this squeezing or coining process, the portion 91 becomes less in thickness but greater in diameter. The portion 101 is the same in diameter as the diameter of the clutch cam 52 measured across the arms 56, and is the same in thickness as the thickness of the arms 56 of the cam 52. During the process of squeezing the portion 91 of the part 90 to form the portion 101 of the part 100, the material of the portion 91 which is under high pressure, flows outwardly to produce the portion 101 of greater diameter. The end wall of the counterbore 96 is at a distance from the remote end of the portion 92 equal to the over-all length of the finished clutch cam. The coining dies between which the portion 91 is squeezed to form the portion 101 are shaped so as to form or permit the formation of an annular boss 102 surrounding the central bore 94 and an annular boss 103 shown in Figs. 5 and 6. The annular boss 102 may engage a similar annular boss provided by the clutch shell 53 on the interior plane wall thereof. After forming the cylindrical portion 101 in the manner described, a suitable broach is passed through the bore portion 95 of smaller diameter and the inside wall thereof is cut away to provide the internal splines 67 which provide the slidable driving connection between the cam 52 and the splines of the shaft along which the cam 52 is slidable.

The next step is to provide the portion 101 with the roller receiving notches indicated by numeral 55 in Fig. 1. This is accomplished by placing the part 100 in a suitable punch press which forms the part 110 shown in Fig. 4 from the part 100 shown in Fig. 3. During this operation, the notches 55 are roughly formed by shearing away slugs of material 111. The punches which rough form the notches 55 do not move all the way through the cylindrical portion 101 but only sufficiently far through it to shear the slugs 111 from the remaining portion of the part 101. It has been found that the punches are capable of performing a much greater number of operations before sharpening if they are not caused to shear completely through the part 101 but to shear through the part 101 a distance sufficient to break the slugs 111 away from the remaining parts. The slugs 111 may not fall of their own accord or by their own weight from the roughly notched portion 101, and it is not necessary to remove the slugs 111 before finally forming the notches 55 as shown in Fig. 5.

Figure 4:
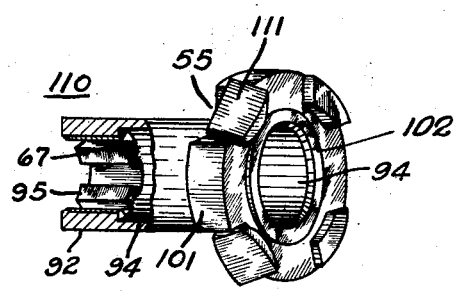
Figure 5:
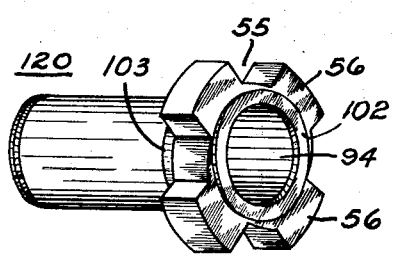

The step of forming the part 120, shown in Fig. 5, from the part 110, shown in Fig. 4, is performed preferably by a milling machine having a rotary cutter, the peripheral profile of which is adapted to produce a notch of the correct contour as shown in Fig. 1. The milling cutter makes a finishing cut through the roughly shaped surfaces defining the notch 55, and in so doing, removes the slug 111 which may have occupied the notch.

Figure 6:
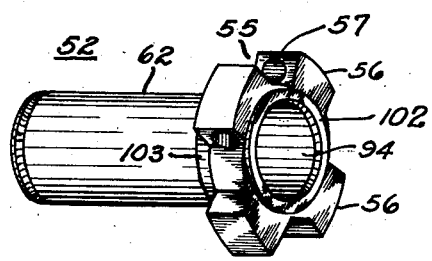

Fig. 6 shows the cam 52 completely formed and this part is made from the part 120 shown in Fig. 5 by providing each of the arms 56, defining the notches 55, with a hole 57 for receiving the spring 58 and the plunger 59 as shown in Fig. 1. Before the part 52 can be used as the clutch cam, it must be hardened and ground to fit the shell 53 and the collar 71. The part 52 is preferably carburized in bone charcoal within a carburizing pot for approximately four hours and at about 1700° F. After being permitted to cool with the bone charcoal in the carburizing box, its cover having been removed, the part 52 is immersed in a bath of potassium cyanide for about thirty minutes, the bath having a temperature of about 1340° F. The part is quenched in water. The temper of the shank or hub portion 62 is drawn by immersing this part for about two minutes in a salt bath maintained at about 900° F., immediately following which the part 52 is quenched in warm water. These heat treatments are intended to make those surfaces which are engaged by the clutch rollers 54 very hard and hence very durable and to make the hub 62 and particularly the splines 67 relatively hard and at the same time relatively tough.

From the foregoing description of the method of manufacturing the clutch cam 52, it is apparent that certain advantages result therefrom. The present invention makes it possible to manufacture the cam from a bar of metal having a diameter less than the greatest diameter of the finished product. This advantage is the result of employing that step in the process by which the diameter of the part 91 is increased to form a part 101 of greater diameter as has been made apparent with particular reference to Figs. 2 and 3. Another advantage results from the fact that the notches 55 are formed partly by punching and partly by cutting with a milling cutter. This sequence of operations permits the most economical use of punching and cutting tools. From a consideration of these advantages it is apparent that overrunning clutches of this type may be made more economically than heretofore.

While the form of embodiment of the present invention as herein disclosed, constitutes a preferred form, it is to be understood that other forms might be adopted, all coming within the scope of the claims which follow.

What is claimed is as follows:

1. The method of making the cam-member of an overrunning clutch which consists in axially deforming a metal disc to increase its diameter and in notching the disc to provide ball or roller recesses.

2. The method of making the cam-member of an overrunning clutch which consists in making a metal disc, and in forming notches in the disc by first partly punching through the metal and then forcing out the unremoved slug and finishing the cut with a cutting tool.

3. The method of making the cam-member of an overrunning clutch which consists in axially deforming a metal disc to increase its diameter, and in forming notches in the disc by first partly punching through the metal and then forcing out the unremoved slug and finishing the cut with a cutting tool.

4. The method of forming a notch in a relatively thick metal body, which consists in roughing out the notch by a punching operation in which the punch is forced only partially through the body, and in finishing the notch by using a cutting tool which also removes the slug which may have remained in the notch after the punching operation.

In testimony whereof I hereto affix my signature.

RODGER J. EMMERT.